(12) United States Patent
Shackelford et al.

(10) Patent No.: US 7,011,204 B2
(45) Date of Patent: Mar. 14, 2006

(54) CONTAINER TRANSPORT APPARATUS FOR USE IN MANUFACTURING OPERATIONS AND METHOD THEREOF

(75) Inventors: Michael L. Shackelford, Joplin, MO (US); Donald W. Sonntag, Carl Junction, MO (US)

(73) Assignee: Reagent Chemical & Research, Inc., Ringoes, NJ (US)

( * ) Notice: Subject to any disclaimer, the term of this patent is extended or adjusted under 35 U.S.C. 154(b) by 222 days.

(21) Appl. No.: 10/699,621

(22) Filed: Oct. 31, 2003

(65) Prior Publication Data

US 2004/0141833 A1 Jul. 22, 2004

Related U.S. Application Data

(60) Provisional application No. 60/423,028, filed on Nov. 1, 2002.

(51) Int. Cl.
*B65G 47/24* (2006.01)

(52) U.S. Cl. ..................................... 198/409; 198/486.4
(58) Field of Classification Search ................ 198/409, 198/486.2, 412, 486.4, 486.5, 750.11, 750.12, 198/750.13
See application file for complete search history.

(56) References Cited

U.S. PATENT DOCUMENTS

| | | | | |
|---|---|---|---|---|
| 4,502,588 A | * | 3/1985 | Whiteside et al. | 198/409 |
| 4,674,935 A | * | 6/1987 | Feliks et al. | 198/468.4 |
| 5,013,213 A | * | 5/1991 | Roberts et al. | 198/409 |
| 5,082,192 A | * | 1/1992 | Langen et al. | 198/409 |
| 5,147,026 A | * | 9/1992 | Scaglia | 198/409 |
| 5,333,720 A | * | 8/1994 | Zwigart et al. | 198/409 |

OTHER PUBLICATIONS

Squeeze Tube Filling Equipment, Item No. LVF RT 40, distributed by Prosys Innovative Packaging Equipment, 422 East 17th Street, Webb City, Missouri 64870.
Squeeze Tube Filling Equipment, Item No. LVF RT 70, distributed by Prosys Innovative Packaging Equipment, 422 East 17th Street, Webb City, Missouri 64870.
Automatic Squeeze Tube Filling Equipment, Item No. LVF RT 140, distributed by Prosys Innovative Packaging Equipment, 422 East 17th Street, Webb City, Missouri 64870.

* cited by examiner

*Primary Examiner*—Joseph Valenza
(74) *Attorney, Agent, or Firm*—Timothy J. Martin; Michael R. Henson; Rebecca A. Gegick

(57) ABSTRACT

A transport assembly and method for containers includes an actuator arm coupled to the drive shaft of a motor and extending radially therefrom so as to be driven between two angular positions. A load arm carries a transport head that releasably engages a selected container at a first station. The load arm is coupled to the actuator arm and is driven in conjunction with a constraining mount that controls its motion. The transport head can grip the container such as with a vacuum. The transport head lifts the container from a first station, moves it to a desired location and places it in a second station. A cam-driven plunger assembly is also shown and operates to seat the container in the second station. The method includes steps performed by this structure, and the application of a seating force to mate a container in the second station.

35 Claims, 6 Drawing Sheets

CONTAINER TRANSPORT APPARATUS FOR USE IN MANUFACTURING OPERATIONS AND METHOD THEREOF

This application claims the benefit of U.S. Provisional Application No. 60/423,028, filed Nov. 1, 2002.

FIELD OF THE INVENTION

The present invention broadly relates to an apparatus for use during the manufacture of filled-container products to move them from a first station to a second station. More particularly, the present invention relates to an apparatus for transporting empty containers from a supply bin and placing the empty containers on a receiving platform for further processing operations. Specifically, the present invention relates to a tubular container transport apparatus for accurately placing empty tubular containers into a respective opening associated with the receiving platform where the containers may thereafter be filled with product.

BACKGROUND OF THE INVENTION

Prior to the Industrial Revolution many laborers worked in factories using very simple machines and primitive assembly lines to produce products. The vision of a sequential manufacturing process and mass production gave rise to the Industrial Revolution. During that era, new and more complex machines were introduced into the factory setting and the onset of standardized parts, assembly line production, and conveyor belts reduced the amount of skill needed on the factory floor to simple labor.

Today, in many parts of the world, most manufacturing processes are machine automated. Computer technology has further diversified the types of machinery capable of being used. Computers have also enhanced the precision of the manufacturing process that, in turn, has increased the quality of goods. Accordingly, today, there are a wide variety of products that are manufactured by a mechanized process. One example is the manufacture of products that are packaged in tubes. Some products, like shaving creams, whipped cream, aerosol sprays, etc. may be packaged in metal tubes made of aluminum. Other products, such as hand creams, shampoos, tanning lotions, toothpaste, and adhesives may be packaged, instead, in plastic tubular containers. The tubes are typically decorated with colorful indicia to advertise and sell the product.

The manufacturing process of making tube products typically involves the use of machinery starting from the introduction of raw materials to the ultimate creation of the tube-filled product. Improvements to the equipment used during this manufacturing process is necessary to increase the quality of the product and reduce the number of breakdowns or stoppages during the process that can increase cost and sometimes result in lost sales. There are several machines that are used throughout the manufacture of tube products. For example, some companies have a machine that is dedicated to filling the empty tube container with product. Typically, many empty tubes are fed into this machine on a continuing basis. The tube-filling machine may have sensors to insure the accuracy of the fill so that tubes are not over-filled or under-filled. Efficient tube fill machines will cut-off flow of the product once the tube is filled and eliminate dripping or stringing of the product while the new empty tube is being engaged.

Accurate tube registration is important to the proper functioning of the tube-filling machine. If a tube is not registered correctly, it could possibly damage the tube-filling machine or there may be product spillage leading to a stoppage of the process. Typically, when the tube filling station stops, the entire manufacturing process is halted. Accordingly, there is a need for a new and improved apparatus and methodology that is capable of efficiently and accurately registering empty tubes to be received by the filling station. There remains a need to provide a new and useful apparatus and methodology for ensuring proper alignment and registration of the containers to be filled. There is a further need to overcome the drawbacks associated with the prior art in such a manner which does not disrupt the manufacturing process. A further need exists for equipment that can accurately and efficiently move containers at relatively high speeds. The present invention is particularly directed to satisfying these needs.

SUMMARY OF THE INVENTION

An object of the present invention is to provide a new and improved container transport apparatus and method to transport empty containers during a manufacturing process.

Another object of the present invention is to provide a container transport apparatus that transports empty tubular containers from a supply bin and accurately places those tubular containers in a second location, where they can be thereafter received by filling equipment and filled with product;

Yet another object of the present invention is to reduce the occurrence of stoppages of the filling equipment, that may, for example, be caused when empty containers are inaccurately situated before proceeding to the filling equipment;

Another object of the present invention is to provide a reliable apparatus and method for inserting empty containers in selected openings associated with a receiving area so as to reduce the number of personnel needed to monitor the manufacturing process;

Yet another object of the invention is to provide apparatus and methods of efficiently and accurately processing containers at selectively high speeds.

A still further object of the present invention is to provide an adjustable container transport apparatus that is able to both transport and accurately place empty containers of varying sizes to a location where they may be received by product filling equipment.

According to the present invention, then, a transport assembly is provided that is operative to transport a container from a first station to be placed in a second station spaced from the first station such that the container may be available for further processing operations. Broadly, the transport assembly has a support frame that supports a drive including a drive shaft that is rotatable about a drive axis. An actuator arm has a first actuator arm end portion coupled to the drive shaft with the actuator arm extending radially therefrom to terminate in a second actuator arm end portion. Rotation of the drive shaft acts to drive the actuator arm between a first angular position and a second angular position. A load arm is connected to the actuator arm and has a first load arm end portion pivotally coupled to the actuator and a second load arm end portion opposite the first load arm end portion. A transport head is supported on the load arm and is operative to releasably engage a container. A constraining mount is disposed on the support frame in spaced relation to the drive axis. This constraining amount engages the load arm and is operative to constrain the movement thereof so that the transport head moves between a container collection position and a container placement position. When in the container collection position, the transport head is located proximately to the first station whereat the transport head can engage a selected container when the actuator arm is in the first angular position. When in the container placement position, the transport head is located proximately to the second station whereas the transport head can release the selected container when the actuator arm is in the second angular position.

In the disclosed embodiment, the drive is reversible so that the actuator arm can move selectively back and forth between the first and second angular positions so that the transport head moves back and forth between the container collection and the container placement positions. In this embodiment, the actuator arm moves approximately 90 degrees of angular rotation between the first angular position and the second angular position. The constraining mounts slideably engages the load arm so that, when the drive shaft moves the actuator arm, the load arm may slide relative to the constraining mount. Here, also, the constraining mount is rotatable about a rotation axis such that, when the drive shaft moves the actuator arm, the load arm can rotate with the constraining mount about the rotation axis as the load arm slides relative to the constraining mount. Here, also, a height adjustable support post may be provided that is operative to vary the height of the support frame relative to a support surface.

Further in the disclosed embodiment, the transport head is a vacuum head so as to pick up a container under a suction force. Accordingly, a vacuum source is provided, and the vacuum head is in fluid communication with the vacuum source. The constraining mount can have a vacuum passageway extending therethrough with the vacuum passageway having an inlet and an outlet. The inlet of the constraining mount may be in fluid communication with the vacuum source and the outlet is then in fluid communication with the vacuum head. The vacuum head can have a channel formed therein to receive a container and at least one aperture is located in the channel such that the vacuum source generates negative pressure at a location proximately to the channel. The channel can be sized and adapted to nestibly receive the tubular container. To this end, the channel can have a radius of curvature that is similar to the radius of curvature of a sidewall of a cylindrical tubular container.

The transport assembly can also include a plunger assembly, if desired. Here, the plunger assembly includes a plunger rod and a plunger head supported by the plunger rod. A plunger actuator is then operative to reciprocate the plunger rod and thereby move the plunger head so that the plunger head assists the transport head in placing a selected container in the second station. The plunger assembly can further include a housing wherein at least a portion of the plunger rod is disposed in the housing. A camming slot is then formed in the housing, and a follower peg is disposed on the plunger rod in such position to engage the camming slot thereby to control movement of the plunger rod and the plunger head upon reciprocation of the plunger rod. This camming slot can have a longitudinal portion and an arcuate portion. With this construction, the plunger head can move between a disengaged position, an aligned position and an engaged position. When in the disengaged position, the plunger head is offset from the second station. When in the aligned position, the plunger head is aligned with a selected container when the transport head is in the container to depositing position. When in the engaged position, the plunger head is in contact with the selected container thereby to apply a force to assist its placement in the second station. Here, also, the disclosed embodiment shows a plunger actuator that includes a lever that moves between a first lever position and a second lever position thereby to reciprocate the plunger rod. The plunger actuator can include a cam drive acting on the lever to move the lever between a first lever position and a second lever position.

The present invention also concerns a method of sequentially transporting empty containers from a first station to place them in a second station spaced from the first station so that the container is available for further processing operations. Here, the containers each have a sidewall and first and second end portions. The second station is adapted to mateably receive the first end portion of each of the containers.

The disclosed method includes a step of loading a bulk supply of containers single file in a supply bin located at the first station. The method then includes the step of releasably engaging the sidewall with selected one of the containers and, thereafter, transporting the selected one of the containers to the second station and oriented the selected one of the containers such that the first end portion thereof is proximate to the second station. Thereafter, the method includes the step of applying a force to the second end portion of the selected one of the containers thereby to advance it into a mated engagement with the second station while maintaining engagement of the sidewall of the selected one of the containers. Thereafter, the method includes the step of releasing the sidewall and removing the force from the second end portion of the selected one of the containers. These processing steps may be then repeated for sequential containers.

In the method disclosed, the step of applying the force to the second end portion of the selected container is accomplished by applying the mechanical force. The step of engaging the sidewall of the selected container is accomplished by applying suction thereto. This method may be used with containers that are elongated. Here, the step of loading the bulk supply of containers orients the containers horizontally in the step of orienting the selected one of the containers positions the selected container generally vertically.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention relates to a new and improved container transport apparatus that may be used to improve the efficiency of the manufacturing process involved in the production of container filled products and methodology therefor. More particularly, the present invention relates to a tubular container transport apparatus for the transportation of empty tubular containers from a first station to a second station where the second station is capable of receiving and holding the empty container so that it may thereafter be received by tube filling equipment.

The container transport apparatus contemplated by the present invention may include a transport assembly for transporting a selected container from a first station and placing it into a second station, and a plunger assembly to assist in the accurate placement of the container in the second station. Broadly, the transport assembly includes an actuator arm, a load arm, a transport head, and an actuator drive, which interact so as to selectively transport one container at a time from the first station and place the container in the second station. The plunger assembly broadly includes a plunger rod, a plunger head, and a plunger actuator, which interact to assist in placing the container in the second station.

Figure 1:
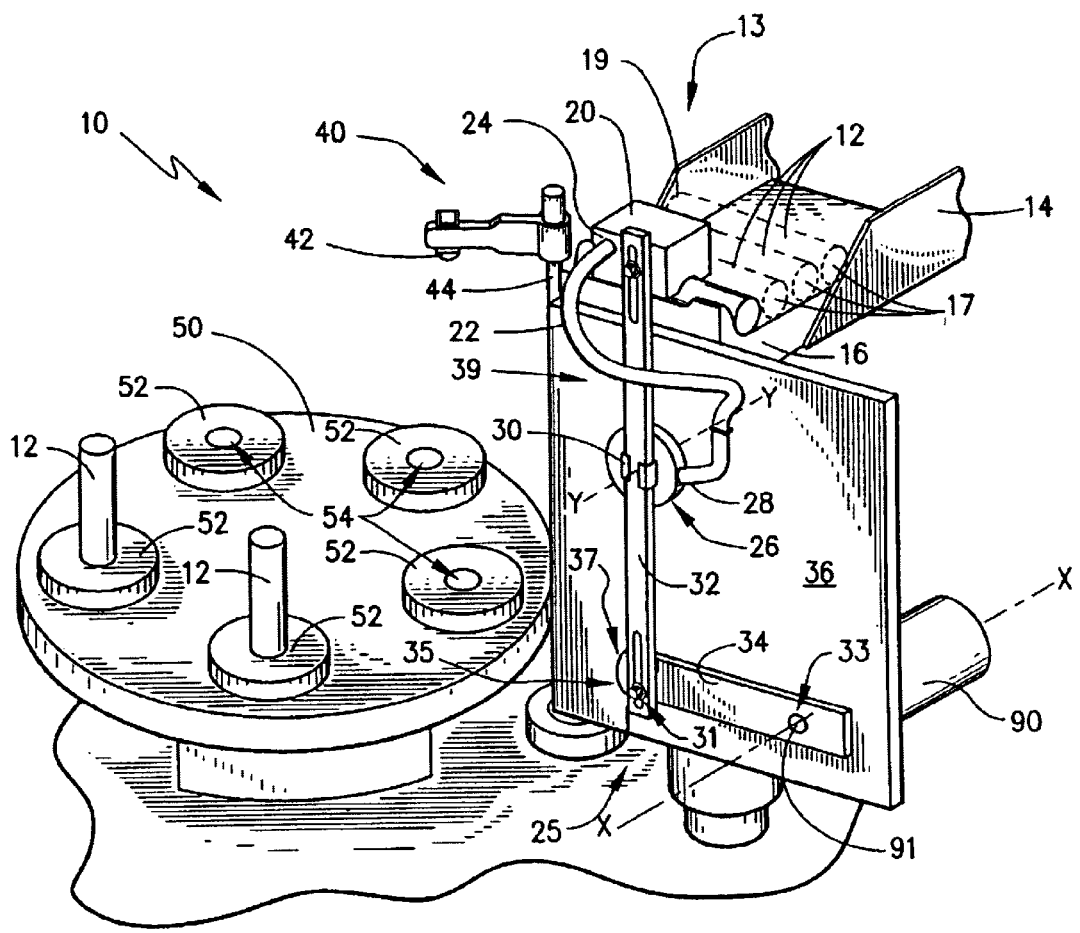
FIG. 1 is a perspective view of the transport apparatus according to the present invention.
Figure 2:
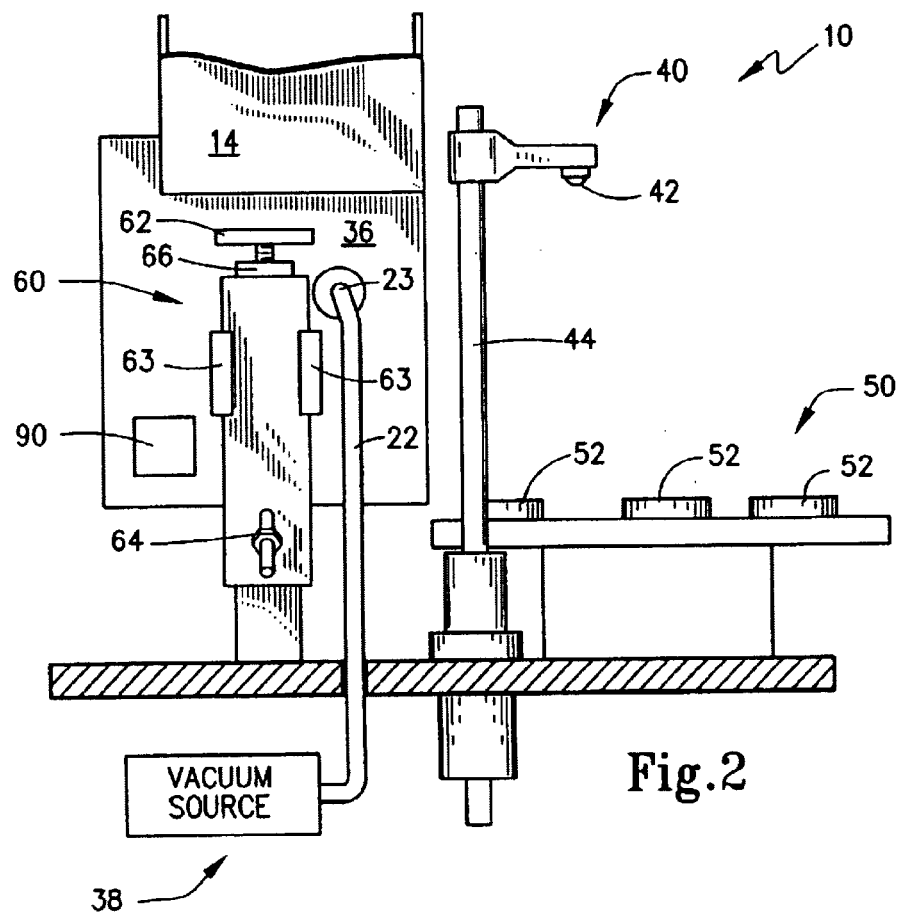
FIG. 2 is a rear view in elevation of the transport apparatus in FIG. 1.

In order to better appreciate the present invention, reference is first made to FIGS. 1 and 2, which show the container transport apparatus according to an exemplary embodiment of the present invention. Container transport apparatus is shown to include a transport assembly 25 and a plunger assembly 40. Transport assembly is powered by drive 90, which includes a drive shaft 91 that rotatable about a drive axis X. Drive 90 may include a drive shaft that is rotatable about a drive axis. Drive 90 may be any suitable source such as a servo-motor, a stepper motor, a hydraulics motor, or an air cylinder motor, just to name a few. Further, drive 90 may be reversible.

As shown, actuator arm 34 has a first actuator arm end portion 33 and extends radially therefrom to terminate in a second actuator arm end portion 35. The first actuator arm end portion 33 is coupled to drive shaft 91, which acts to drive actuator arm 34 between a first angular position and a second angular position. The distance between the first angular position and the second angular position is approximately 90° and is discussed in further detail below.

Transport assembly 25 also includes load arm 32, which has a first load arm end portion 37 and a second load arm end portion 39 opposite thereof. First load arm end portion 37 is pivotally coupled to actuator arm 34 by fastening means 31, for example a nut and bolt or other means that permit load arm 32 and actuator arm 34 to be pivotally moveable relative to one another.

Transport assembly 25 further includes transport head 20 and constraining mount 26. Transport head 20 is supported by load arm 32 and operative to releasably engage the container to be transported. As shown here, transport head 20 may be supported by second load arm end portion 39, but is not limited to this location. Constraining mount 26 is disposed on support frame 36 and, as shown, is in spaced relation to the drive axis X. Constraining mount 26 is rotatable about a rotation axis Y and slidingly engages load arm 32 by means of slide coupling 30 thereby to control the movement of transport head 22 as it moves between the first station and the second station.

With reference now to FIGS. 1 and 2, transport head 20 may be in the form of a vacuum head 20 that is in fluid communication with vacuum source 38 that is operative to permit vacuum head 20 to hold a container as it is removed from the first station and transported to the second station. Accordingly, vacuum source 38, is preferably a high volume low vacuum source.

Vacuum head 20 may be interconnected to the vacuum source 38 via vacuum line 22. As contemplated, vacuum line 22 may be any type of flexible or rigid hose capable of conducting negative pressure through vacuum head 20 to create enough vacuum to lift and selectively retain tube container 12 on vacuum head 20. As should be understood by the person of ordinary skill in the art, the transport head is not limited to a vacuum head, but rather may be of any structure capable of releasably engaging a container thereby to transport the selected container from the first station and place the container into a second station.

As shown in FIGS. 1 and 2, constrainer mount 26 may serve as a vacuum passageway through which vacuum line 22 interconnects vacuum head 20 and vacuum source 38. More particularly, constraining mount 26 may have an inlet 23, which is in fluid communication with the vacuum source 38 and an outlet 28, which is in fluid communication with vacuum head 20.

As shown in FIGS. 1 and 2, transport apparatus 10 also includes plunger assembly 40, which assists transport assembly 25 with the placement of the transported containers in the second station. As shown, plunger assembly 40 includes plunger head 42, which is supported by plunger rod 44. Plunger head 42 may be constructed of any suitable material for engaging a container so as not to damage the tube. For example, plunger head 42 may be made of a soft rubber material, plastic, or the like.

Now that the components of the transport assembly 25 and plunger assembly 40 have been introduced, their respective functions and movements may now be generally described. With continued reference to FIG. 1, transport assembly 25 is operative to selectively remove containers 12 from supply bin 14, which is associated with first station 13. It may be noted that vacuum head 20 engages a container 12 from a location above its sidewall. Transport assembly 25 then transports this container to a receiving platform, shown here as dial 50, and place the containers in second station 52, which is shown to be in the form of tube holders 52 having openings 54 associated therewith. During this cycle, another container 12 can move into position at the first station 13. This helps speed the cycling of the assembly. Also, as is shown in the figures, containers 12 are in the form of tubular containers, which are generally cylindrical in configuration and having a cylindrical sidewall, a first tube end 17, and a second tube end 19. Thus, they can advance in supply bin 14 under the force of gravity.

Generally, transport assembly 25 accomplishes the sequential transportation of each one of the tubular containers 12 through the simultaneous movements of actuator arm 34 and load arm 32, which move the transport head between the first and second stations. As contemplated, plunger assembly 40 assists in the accurate placement of the containers in the second station, or, as exemplified in the Figures, plunger assembly 40 assists in the accurate placement of the tube containers 12 within the respective openings 54.

Once a tube container is positioned into its respective tube holder 52, dial 50 rotates to expose an empty tube holder 52 for alignment with the next tube container 12. As best shown in FIG. 1, dial 50 includes five (5) tube holders 52. However, a person ordinarily skilled in the art should appreciate that dial 50 may include either more or less tube holders depending upon the needs. Typically, eight or more tube holders may be provided on a dial.

Also as shown in FIG. 2, container transport apparatus 10 may include means by which its height may be adjusted. Height adjustment capability, such as contemplated by the present invention, allows the container transport apparatus of the present invention to be used to transport differently sized containers thereby to enhance its versatility in this industry. As shown, height adjustment mechanism 60 is attached to support frame 36 by bracket 63 and may be operated, for example, by height adjustment wheel 62. Height adjustment wheel 62 may be rotated either in a clockwise or counterclockwise direction to adjust the height of the container transport apparatus. Height adjustment mechanism 60 may further include a camming height lock handle 64 to maintain the height adjustable mechanism 60 at its desired position. Further, height adjustment mechanism 60 may be associated with a device or indicator 66, which provides a digital readout of the height at which height adjustment mechanism 60 has set container transport apparatus 10.

Figure 3:
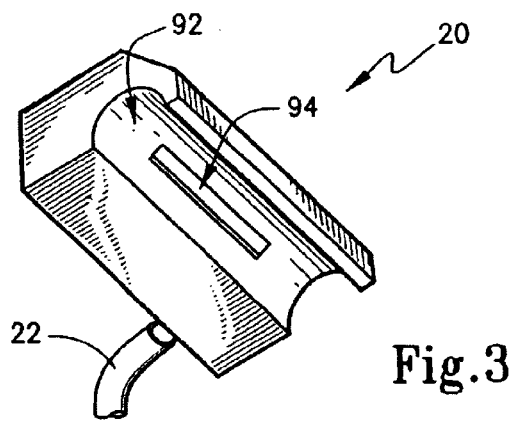
FIG. 3 is an enlarged view of the vacuum head of the transport apparatus shown in FIGS. 1 and 2.

Turning now to FIG. 3, vacuum head 20 includes a channel 92, which may have a radius of curvature that is about the same as the radius of curvature of a container to be transported. For example, with respect to tubular containers 12, shown in FIG. 1, channel 92 may have approximately the same radius of curvature as the tubular containers thereby to nestibly receive a selected tube container 12 to be transported.

As contemplated, channel 92 may be varied so that it may receive tube containers of varying diameters. Vacuum head 20 further includes aperture 94. When the vacuum source is activated, it generates negative pressure at a location proximate to aperture 94 enabling vacuum head 20 to releasably engage a tube container 12 and hold it within channel 92. The suction generated by the vacuum source allows vacuum head to hold a tube container as it is removed from the first station and transported to the second station. Further, as should be appreciated, once the container is placed within the respective opening, the vacuum source may be deactivated to release its hold on the container.

Figure 4:
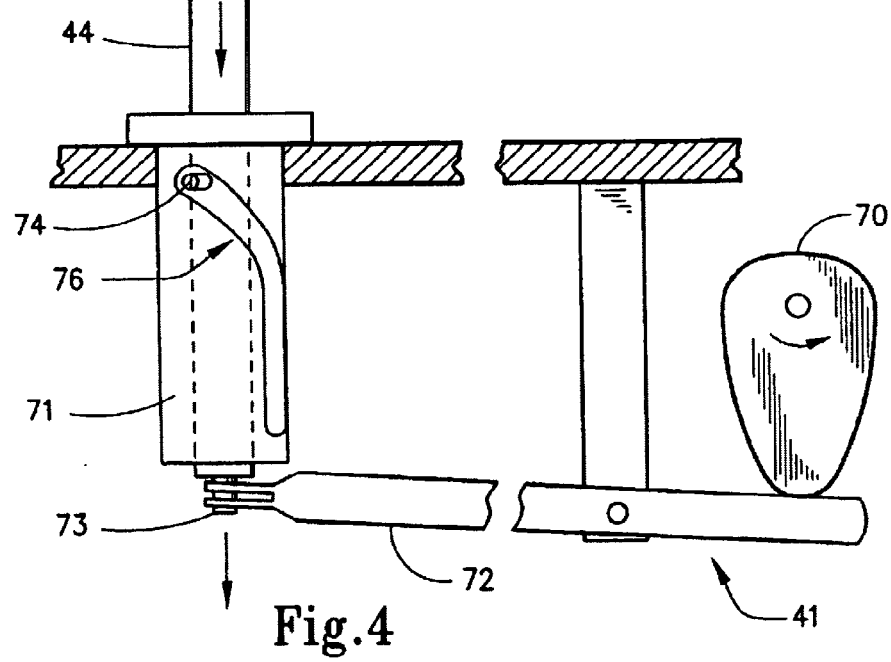
FIG. 4 is a diagrammatic representation of the movement of plunger assembly.

Before proceeding to a diagrammatic representation of the tube loading process, it is perhaps useful to first describe the movement of plunger assembly 40 and the mechanism by which it is moved. With reference then to FIG. 4, plunger rod 44 is shown to be partially disposed in housing 71. As shown, housing 71 includes a camming slot 76 formed therein. As shown, camming slot 76 may include an arcuate portion and a longitudinal portion. A follower peg 74 is positioned on plunger rod 44 so as to engage camming slot 76 and control the movement of both plunger rod 44 and plunger head 42 upon reciprocation of plunger rod 44. As such, plunger head 42 is operative to move from a disengaged position where it is offset from the second station; to an aligned position where it is aligned with the selected container that has been placed in the second station; to an engaged position where it is in contact with the selected container thereby to assist its placement in the second station.

The movement of plunger assembly 40 is powered by a plunger actuator 41, which may include cam drive 70 and lever 72. As shown, cam drive 70 is supported by lever 72 and coupled to the plunger rod at junction 73. Cam drive 70 may then act upon lever 72 to move lever 72 between a first lever position and a second lever position thereby to reciprocate the plunger rod in an upward and downward motion. For example, as cam drive 70 is rotated in a counterclockwise direction as indicated by the cam drive arrow, plunger rod 44 travels downwardly in housing 71 as shown by the arrows.

As plunger rod 44 descends, follower peg 74 follows the trajectory of camming slot 76. Since, as shown here, camming slot 76 includes an arcuate portion and a longitudinal portion, plunger rod 44 will rotate as plunger rod 44 continues to travel downwardly. As will be discussed in more detail later, this rotational movement permits plunger head 42 to align with the container that is placed within the second station.

Figure 5A:
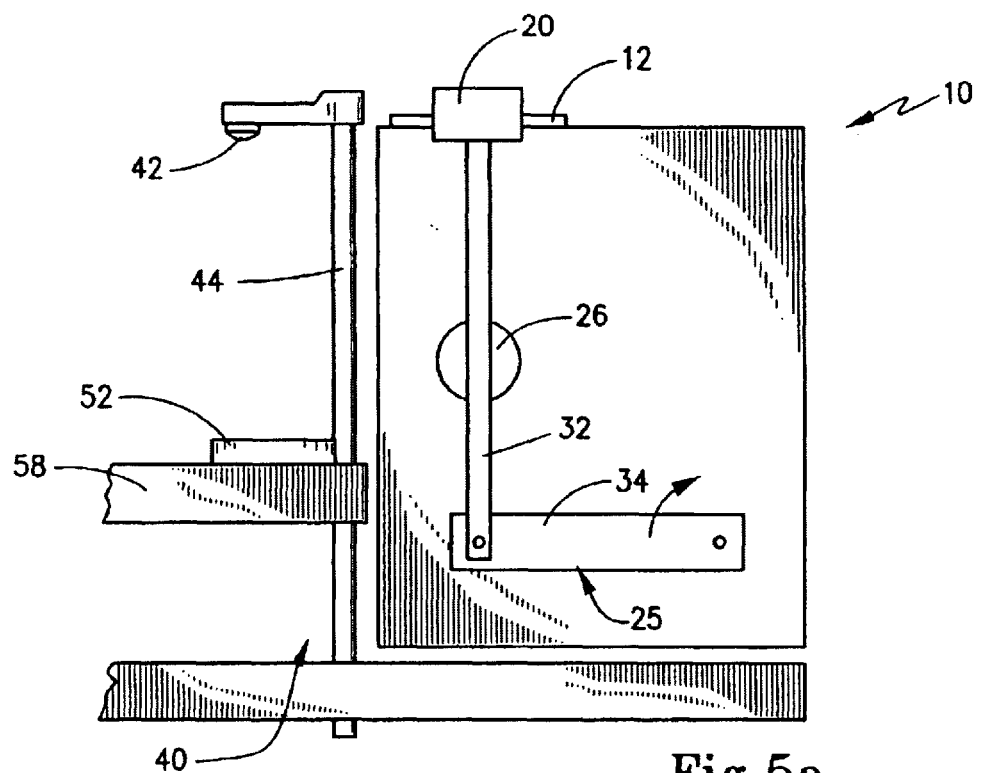
FIG. 5(a) is a diagrammatic representation of the transport apparatus when the transport head is in the container collection position and the plunger assembly is in the disengaged state.

The movements of the container transport apparatus are shown in the diagrammatic representations in FIGS. 5(a)–5(h). In FIG. 5(a), the container transport apparatus is in an initial or resting position. With respect to the transport assembly 25, actuator arm 34 is in a first angular position such that vacuum head 20 is in the container collection position and located proximately to supply bin where it may releasably engage a selected container. More particularly, as shown, vacuum head 20 is operative to engage the sidewall of the selected tube container 12. Further, actuator arm 34 and load arm 32 are at 90° with respect to one another. At the same time, plunger assembly is in a disengaged position. As will become more apparent in the following figures, plunger head 42 is offset from the tube holder 52 located on dial 52 such that plunger head 42 is not axially aligned with the opening in tube holder 52.

Figure 5B:
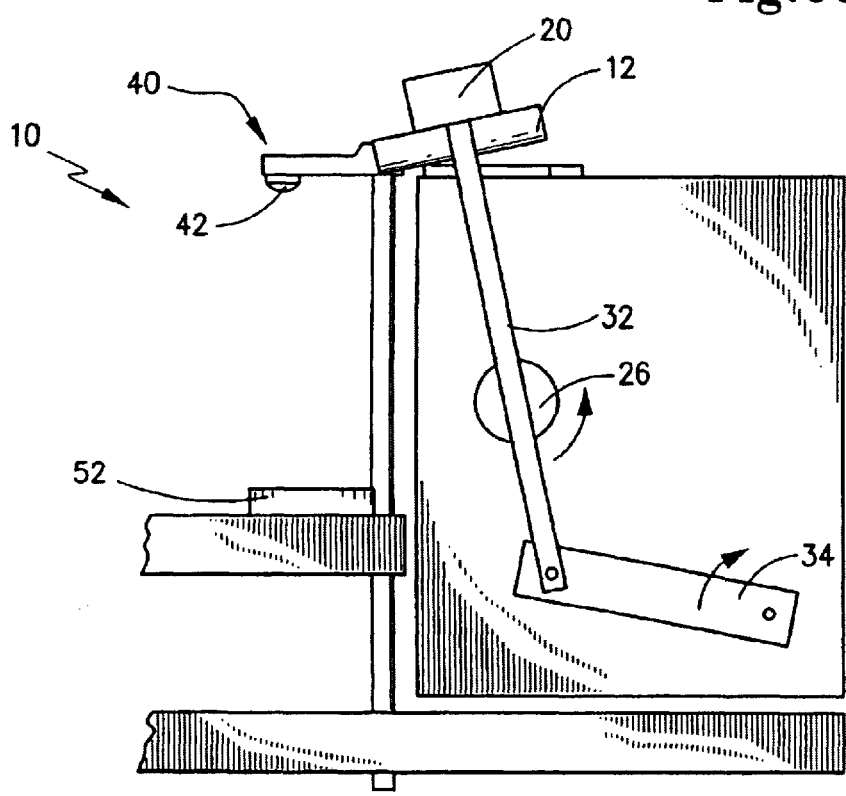
FIG. 5(b) is a diagrammatic representation of the movement of the transport assembly as the transport head begins to transport an empty tubular container to the second station.

From this initial position, drive 90 acts to drive actuator arm 34 and move actuator 34 from its first angular position, as shown in FIG. 5(b). Particularly, drive 90 rotates drive shaft 91 about its drive axis, thereby to move actuator arm 34 in a clockwise direction as indicated by the arrow. As shown, when actuator 34 moves in a clockwise direction, load arm 32 slides relative to constraining mount 26, but it also rotates with it. Accordingly, load arm 32 will rotate with said constraining mount 26 about the rotation axis as load arm 32 slides relative to the constraining mount 26. As a result of this simultaneous movement of the loading arm 32 and actuator arm 34, vacuum head 20 begins to transport tube container 12 to tube holder 52.

Figure 5C:
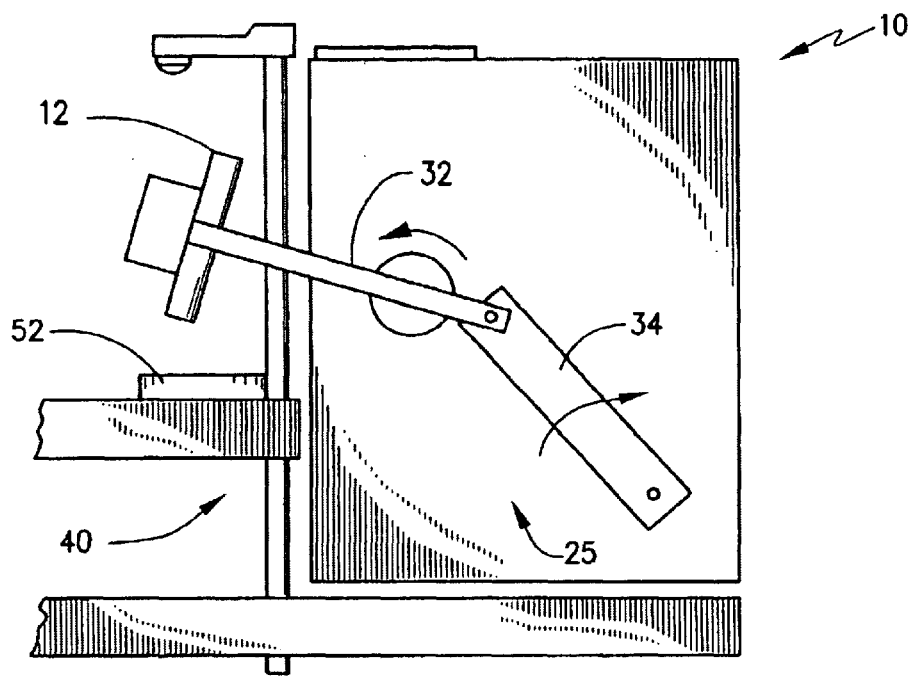
FIG. 5(c) is a diagrammatic representation of the transport apparatus as the transport head moves into the container placement position proximate to the second station.
Figure 5D:
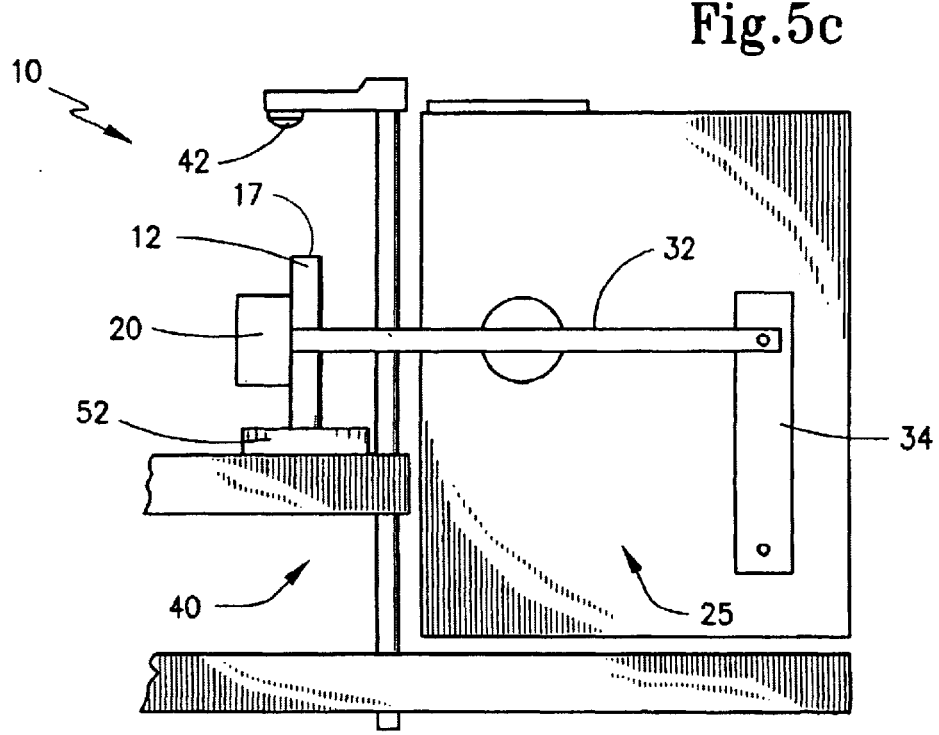
FIG. 5(d) is a diagrammatic representation of the transport apparatus when the transport head is located proximate to the second station in the container placement position.

As shown in FIG. 5(c), actuator arm 34 and loading arm 32 continue their opposing, simultaneous movements to transport tube container 12 orient it so as to place one end of the tube container in the opening (shown in FIG. 1) of tube holder 52 so that, as shown, tube container 12 is standing upright in tube holder 52 and tube container end 17 is exposed. Once tube container 12 is placed within the opening of tube holder 52, the simultaneous, opposing movement of actuator arm 34 and loading arm 32 ceases, as shown in FIG. 5(d). At this time, vacuum head 20 still maintains contact with tube container 12 and is in the container placement position. When vacuum head 20 is in the container placement position, actuator arm 34 has moved to a second angular position, which has shown here, is approximately 90° apart from its first angular position. Further, as shown, load arm 32 and actuator arm 34 are again at a 90°.

Actuation of plunger assembly 40 preferably does not interfere with the placement of the tube container in the second station. Accordingly, plunger assembly 40 could be actuated at some point in time after the tube container has been inserted in the second station, for example, plunger assembly 40 could be actuated when vacuum head 20 is in the container placement position.

Figure 5E:
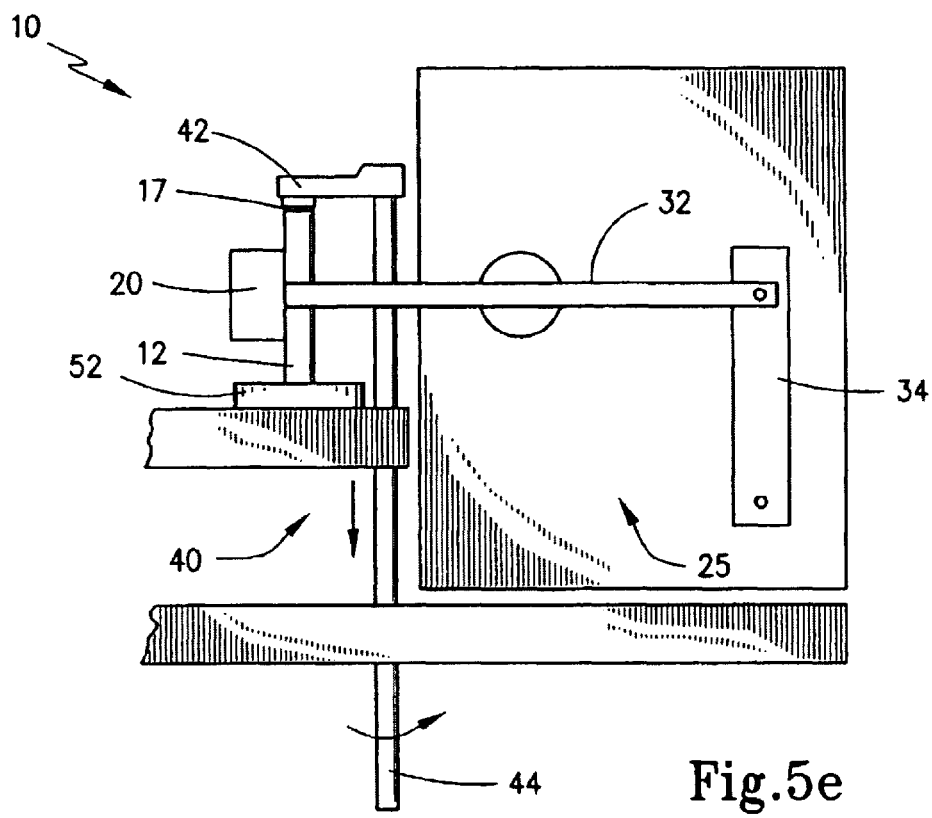
FIG. 5(e) is a diagrammatic representation of the plunger rod leaving the disengaged position and moving downwardly and in a counterclockwise direction to align with the empty tube and into the engaged position to advance the tubular container into a mated engagement with the second station.
Figure 5F:
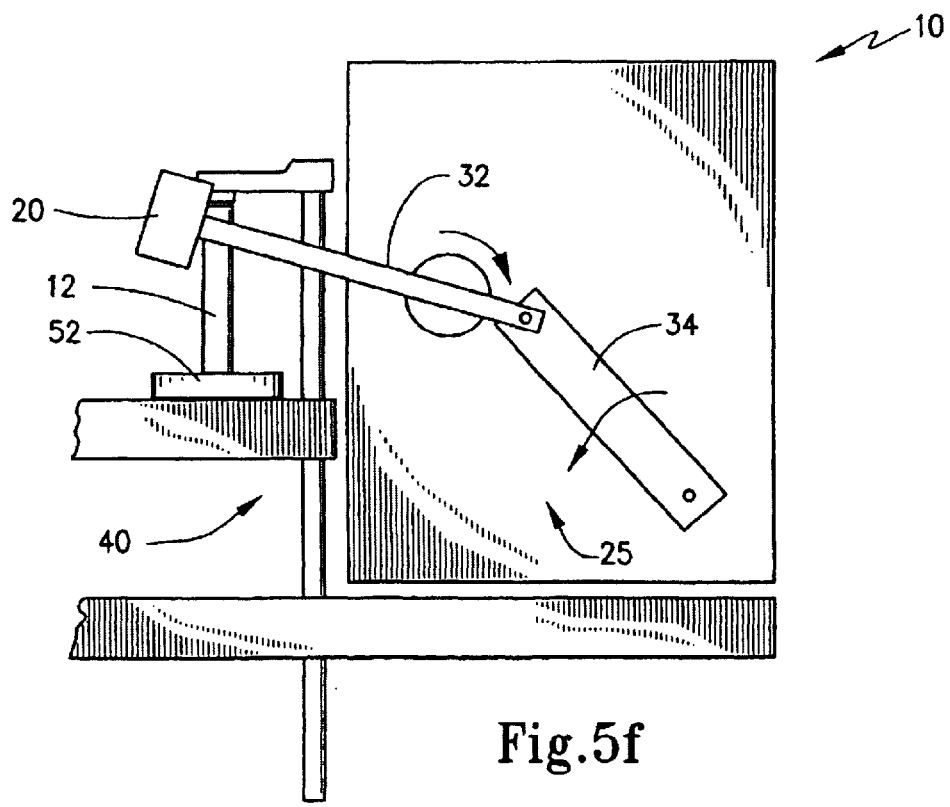
FIG. 5(f) is a diagrammatic representation of the transport head disengaging the sidewall of the tubular container and returning back to the container collection position.
Figure 5G:
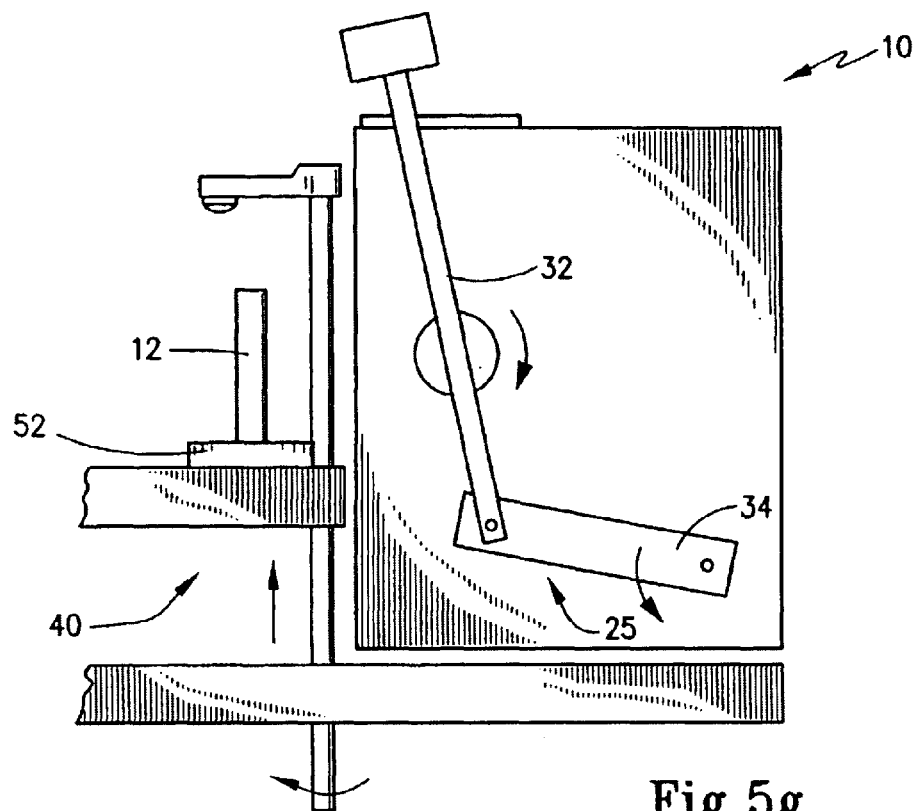
FIG. 5(g) is a diagrammatic representation of the plunger assembly returning to the disengaged position as the transport head continues its movement back to the container collection position.
Figure 5H:
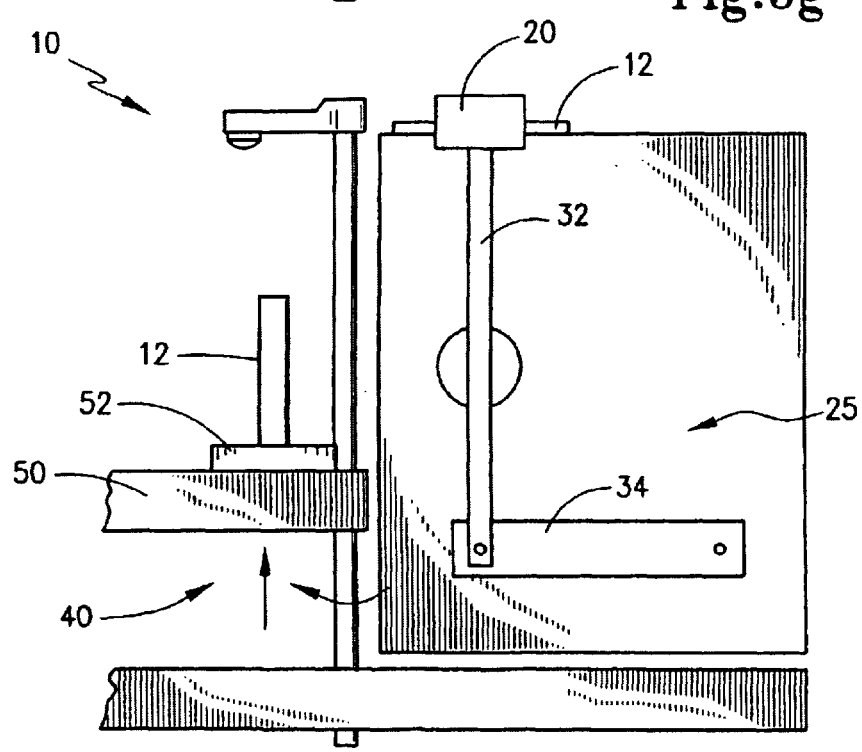
FIG. 5(h) is a diagrammatic representation of the transport apparatus where the transport head has returned to the container collection position and the plunger assembly has returned to the disengaged state, which is equivalent to that shown in FIG. 5(a).

As shown in FIG. 5(e), once plunger assembly is activated, plunger arm 44 moves from the disengaged position where it is offset from the second station, downwardly and rotates plunger head 42 so that it becomes aligned with the tube container end 17 as shown by the arrows to be in the aligned position. Once aligned with tube container end 17, plunger rod 44 continues to its downward movement until plunger head 42 contacts tube container end 17 so as to be in the engaged position. After plunger head 42 contacts tube container end 17, plunger rod 44 continues its downward movement to drive tube container 12 into tube holder 52. Once tube container 12 is inserted, vacuum head 20 releases the sidewall of tube container 12 as actuator arm 34 and loading arm 32 begin their simultaneous, opposing movements back to their start position as shown in FIGS. 5(f)–5(h). Accordingly, actuator arm 34 will move in a counter-clockwise direction, back to its first angular position while loading arm 32 moves in a clockwise direction back to the container collection position. After vacuum head 20 releases its engagement to the sidewall of the inserted container, the plunger assembly 40 will begin its movement back to the offset position. Accordingly, plunger rod 44 will rotate and move upwardly as indicated by the arrows in FIGS. 5(g) and 5(h).

Once movement of the transport assembly 25 and plunger assembly 40 cease, they will again be in their respective start positions as shown in FIG. 5(h). Accordingly, vacuum head 20 is in the container collection position and ready to engage yet another tube container 12. Also, dial 50 will rotate the filled tube holder 52 to a new location to expose yet another empty tube holder for receipt by the tube container now in contact with vacuum head 20. With this assembly, relatively high container processing speeds have been achieved for cylindrical tubular containers at levels of about 110 containers per minute.

Finally, it should be understood that the present invention further contemplates a method of sequentially transporting empty containers from a first station to place them in a second station spaced from the first station so that the container is available for further processing operations. According to the invention, the method includes a step of loading a bulk supply of containers single file in a supply bin located at the first station. Here, the containers may be oriented generally horizontally. The method then includes the step of releasably engaging the sidewall of a selected one of the containers and, thereafter, transporting the selected container to the second station. Engagement of the sidewall of the selected container may be accomplished by applying suction thereto.

During the transportation of the selected container to the second station, the container may be rotated so as to orient the selected container such that a first end portion is placed proximate to the second station so that the second end portion is oriented vertically so that the selected container is oriented generally vertically in the second station. Thereafter, the method includes the step of applying a force to the second end portion of the selected container thereby to advance it into a mated engagement with the second station while maintaining engagement of the sidewall of the selected container. The step of applying the force to the second end portion of may be accomplished by applying a mechanical force. Thereafter, the method includes the step of releasing the sidewall and removing the force from the second end portion of the selected container. These processing steps may be then repeated for sequential containers.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A transport assembly operative to transport a container from a first station to be placed in a second station spaced from the first station where the container is available for further processing operations, comprising:
   (A) a support frame;
   (B) a drive including a drive shaft rotatable about a drive axis;
   (C) an actuator arm having a first actuator arm end portion coupled to said drive shaft and extending radially therefrom to terminate in a second actuator arm end portion whereby rotation of said drive shaft acts to drive said actuator arm between
      (1) a first angular position, and
      (2) a second angular position;
   (D) a load arm having a first load arm end portion pivotally coupled to said actuator and a second load arm end portion opposite said first load arm end portion;
   (E) a transport head supported by said load arm and operative to releasably engage the container;
   (F) a constraining mount disposed on said support frame in spaced relation to the drive axis, said constraining mount engaging said load arm and operative to constrain the movement thereof so that said transport head moves between
      (1) a container collection position wherein said transport head is located proximately to the first station whereat said transport head can engage a selected container when said actuator arm is in the first angular position, and
      (2) a container placement position wherein said transport head is located proximately to the second station whereat said transport head can release the selected container when the actuator arm is in the second angular position.

2. A transport assembly according to claim 1 wherein said drive is reversible.

3. A transport assembly according to claim 1 wherein said actuator arm moves approximately 90° between the first angular position and the second angular position.

4. A transport assembly according to claim 1 wherein said transport head is a vacuum head and including a vacuum source, said vacuum head in fluid communication with said vacuum source.

5. A transport assembly according to claim 4 wherein said constraining mount has a vacuum passageway having an inlet and an outlet, the inlet being in fluid communication with the vacuum source and the outlet being in fluid communication with the vacuum head.

6. A transport assembly according to claim 4 wherein said vacuum head has
   (A) a channel formed therein to receive a container, and
   (B) at least one aperture located in the channel wherein said vacuum source generates negative pressure at a location proximately thereto.

7. A transport assembly according to claim 6 wherein the channel is sized and adapted to nestably receive a tubular container.

8. A transport assembly according to claim 1 wherein said constraining mount slidably engages said load arm so that when said drive shaft moves said actuator arm, said load arm may slide relative to said constraining mount.

9. A transport assembly according to claim 8 wherein said constraining mount is rotatable about a rotation axis so that when said drive shaft moves said actuator arm, said load arm can rotate with said constraining mount about the rotation axis as said load arm slides relative to said constraining mount.

10. A transport assembly according to claim 1 including a plunger assembly including:
    (A) a plunger rod;
    (B) a plunger head supported by said plunger rod; and
    (C) a plunger actuator operative to reciprocate said plunger rod and thereby move said plunger head so that said plunger head assists said transport head in placing the selected container in the second station.

11. A transport assembly according to claim 10 wherein said plunger assembly includes
    (A) a housing wherein at least a portion of said plunger rod is disposed in said housing;
    (B) a camming slot formed in said housing; and
    (C) a follower peg disposed on said plunger rod and positioned to engage the camming slot thereby to control the movement of said plunger rod and said plunger head upon reciprocation of said plunger rod.

12. A transport assembly according to claim 11 wherein the camming slot has a longitudinal portion and an arcuate portion so that said plunger head moves between
    (A) a disengaged position wherein said plunger head is offset from the second station,
    (B) an aligned position wherein said plunger head is aligned with the selected container when said transport head is in the container placement position, and
    (C) an engaged position wherein said plunger head is in contact with the selected container thereby to assist its placement in the second station.

13. A transport assembly according to claim 11 wherein said plunger actuator includes a lever that moves between a first lever position and a second lever position thereby to reciprocate said plunger rod.

14. A transport assembly according to claim 13 wherein said plunger actuator includes a cam drive acting on said lever to move said lever between the first lever position and the second lever position.

15. A transport assembly according to claim 1 including a height adjustable support post operative to vary the height of said support frame relative to a support surface.

16. A container transport apparatus operative to transport containers one at a time from a first station located at a supply bin to a receiving platform and place the containers in a second station defined by an opening associated with the receiving platform that is sized and adapted for receiving and holding a container, comprising:
    (A) a transport assembly, including
        (1) a support frame;
        (2) an actuator arm;
        (3) a load arm coupled to said actuator arm;
        (4) a transport head supported by said load arm that is sized and adapted to engage a container;
        (5) an actuator drive operative to simultaneously move said actuator arm and said load arm thereby to move said transport head between
            (i) a container collection position wherein said transport head engages a selected container to be transported to the receiving platform, and
            (ii) a container placement position wherein the engaged container is positioned proximately to a selected opening associated with the receiving platform; and
    (B) a plunger assembly, including
        (1) a plunger rod;
        (2) a plunger head supported by said plunger rod;
        (3) a plunger actuator operative to reciprocate said plunger rod and thereby move said plunger head so that said plunger head assists with the placement of the engaged container in the second station, said plunger head being movable between
            (i) a disengaged position wherein said plunger head is offset from said engaged container,
            (ii) an aligned position wherein said plunger head is aligned with the engaged container, and
            (iii) an engaged position wherein said plunger head is in contact with the engaged container.

17. A container transport apparatus according to claim 16 wherein said transport head is a vacuum head and including a vacuum source, said vacuum head in fluid communication with said vacuum source.

18. A container transport apparatus according to claim 17 wherein said vacuum head has
    (A) a channel formed therein to receive the container, and
    (B) at least one aperture located in the channel wherein said vacuum source generates negative pressure at a location proximately thereto and engage the container.

19. A container transport apparatus according to claim 18 wherein the channel is sized and adapted to receive a tubular container.

20. A container transport apparatus according to claim 16 wherein said plunger assembly includes
    (A) a housing wherein at least a portion of said plunger rod is disposed in said housing;
    (B) a camming slot formed in said housing; and
    (C) a follower peg disposed on said plunger rod and positioned to engage the camming slot thereby to control the movement of said plunger rod and said plunger head upon reciprocation of said plunger rod.

21. A container transport apparatus according to claim 16 wherein said plunger actuator includes a lever that moves between a first lever position and a second lever position thereby to reciprocate said plunger rod.

22. A container transport apparatus according to claim 21 wherein said plunger actuator includes a cam drive acting on said lever to move said lever between the first lever position and the second lever position.

23. A container transport apparatus according to claim 16 wherein said transport head is located above the containers in the supply bin when said transport head is in the container collection position.

24. A container transport apparatus for use during the production of filled tube products that is operative to sequentially transport unfilled tubular containers, each having a cylindrical sidewall formed at a common radius of curvature, from a supply of such tubular containers located at first station and thereafter to insert an end portion of each said tubular container into a respective second station that has an opening that is sized and adapted for receiving the end portion of each said tubular container, comprising:
   (A) a support frame;
   (B) an actuator arm;
   (C) a load arm coupled to said actuator arm;
   (D) a vacuum head supported by said load arm and in fluid communication with a vacuum source, said vacuum head having a suction channel formed therein formed at a channel radius of curvature that is about the same as the common radius of curvature of said tubular containers;
   (E) an actuator drive operative to simultaneously move said actuator arm and said load arm thereby to move said vacuum head between
      (1) a container collection position wherein said vacuum head engages a selected tubular container, and
      (2) a container placement position wherein said vacuum head inserts the end portion of said selected tubular container into the second station.

25. A tubular container transport apparatus according to claim 24 including a rotatable constraining mount disposed on said support frame that is rotatable about a rotation axis and that slidably engages said load arm so that when said actuator drive moves said actuator arm, said load arm can rotate with said constraining mount about the rotation axis as said load arm slides relative to said constraining mount.

26. A tubular container transport apparatus according to claim 24 including a plunger assembly including:
   (A) a plunger rod;
   (B) a plunger head supported by said plunger rod and sized to nestably engage an end of the tube container;
   (C) a plunger actuator operative to reciprocate said plunger rod and thereby move said plunger head so that said plunger head assists with the insertion of the tube container into the second station, said plunger head being movable between
      (1) a disengaged position wherein said plunger head is offset from the engaged tube container,
      (2) an aligned position wherein said plunger head is aligned with the engaged tube container, and
      (3) an engaged position wherein said plunger head is in contact with the engaged tube container.

27. A tubular container transport apparatus according to claim 26 wherein said plunger assembly includes
   (A) a housing wherein at least a portion of said plunger rod is disposed in said housing;
   (B) a camming slot formed in said housing; and
   (C) a follower peg disposed on said plunger rod and positioned to engage the camming slot thereby to control the movement of said plunger rod and said plunger head upon reciprocation of said plunger rod.

28. A tubular container transport apparatus according to claim 27 wherein the camming slot has a longitudinal portion and an arcuate portion so that said plunger head moves between
   (A) a disengaged position wherein said plunger head is offset from the second station,
   (B) an aligned position wherein said plunger head is aligned with the selected container when said transport head is in the container depositing position, and
   (C) an engaged position wherein said plunger head is in contact with the selected container thereby to assist its placement in the second station.

29. A tubular container transport apparatus according to claim 27 wherein said plunger actuator includes a lever that moves between a first lever position and a second lever position thereby to reciprocate said plunger rod.

30. A tubular container transport apparatus according to claim 29 wherein said plunger actuator includes a cam drive acting on said lever to move said lever between the first lever position and the second lever position.

31. A transport assembly according to claim 24 including a height adjustable support post operative to vary the height of said support frame relative to a support surface.

32. A method of sequentially transporting empty containers from a first station and placing them into a second station spaced from the first station so that the container is available for further processing operations wherein said empty containers each have a sidewall and first and second end portions and wherein the second station is adapted to matably receive the first end portion of each of said containers, comprising:
   (A) loading a bulk supply of containers single file in a supply bin located at the first station;
   (B) releasably engaging the sidewall of a selected one of said containers;
   (C) thereafter transporting the selected one of said containers to the second station and orienting the selected one of said containers such that the first end portion thereof is proximate to the second station;
   (D) thereafter applying a force to the second end portion of the selected one of said containers thereby to advance it into a mated engagement with the second station while maintaining engagement of the sidewall of the selected one of said containers;
   (E) thereafter both releasing the sidewall and removing the force from the second end portion of the selected one of said containers; and
   (F) repeating steps (A)–(E).

33. A method according to claim 32 wherein the step of applying force to the second end portion of the selected one of said containers is accomplished by applying a mechanical force.

34. A method according to 32 wherein the step of engaging the sidewall of the selected one of said containers is accomplished by applying a suction thereto.

35. A method according to claim 32 wherein said containers are elongated and wherein the step of loading a bulk supply of containers orients said containers horizontally and wherein the step of orienting the selected one of said containers positions the selected one of said containers generally vertically.

* * * * *